No. 890,566. PATENTED JUNE 9, 1908.
J. J. LUCKEY.
NUT LOCK.
APPLICATION FILED MAY 9, 1907.
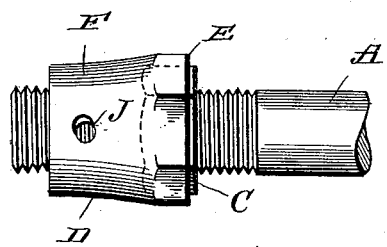
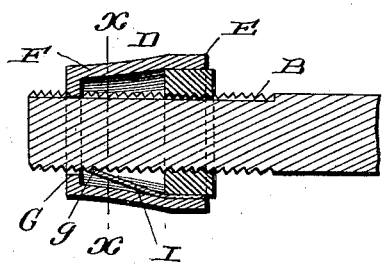
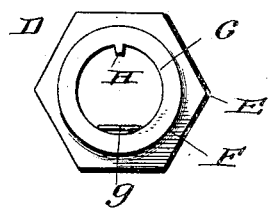
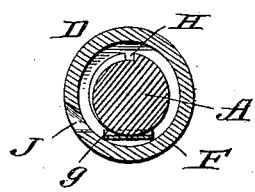
Witnesses
Inventor
John J. Luckey,
his Attorney
THE NORRIS PETERS CO., WASHINGTON, D. C.

UNITED STATES PATENT OFFICE.

JOHN J. LUCKEY, OF HOOD RIVER, OREGON, ASSIGNOR OF ONE-THIRD TO RALPH REED, OF HOOD RIVER, OREGON.

NUT-LOCK.

No. 890,566.      Specification of Letters Patent.      Patented June 9, 1908.

Application filed May 9, 1907. Serial No. 372,659.

*To all whom it may concern:*

Be it known that I, JOHN J. LUCKEY, a citizen of the United States, residing at Hood River, in the county of Wasco and State of Oregon, have invented certain new and useful Improvements in Nut-Locks, of which the following is a specification.

My invention relates to nuts and bolts, more particularly to locks therefor, and it has as its object to provide a device of that character whereby the nut on a bolt may be securely locked in the position to which it is screwed, and thus overcome the liability of any loosening between the parts and consequently the loosening, or possible loss, of the members that are held.

With these objects in view my invention embraces and combines the further feature of housing the nut and the threads of the bolt, and thus providing a protection therefor to prevent rusting or other injury thereto.

The particular construction and arrangement constituting my invention is set forth in the accompanying drawings, in which Figure 1, represents a side elevation of my device. Fig. 2, is a vertical section of Fig. 1. Fig. 3, is an end plan view of the cap, and, Fig. 4, is a section taken on the line x—x of Fig. 1.

In the following which is a more detailed description of my invention, like letters of reference designating corresponding parts in the different views shown.

A is the usual bolt having a longitudinal groove B through the threaded portion thereof. There may be a plurality of these grooves B if desired.

C designates the nut to be locked upon the bolt; and D is the cap or locking means which constitutes my invention.

The cap or locking head D is substantially cylindrical in shape and has its lower or nut gripping portion E polygonal sided, and a trifle greater in diameter than its upper or bolt engaging member designated F. The edge of the bolt engaging member F is turned inwardly as shown by letter G, to provide a circumferential flange whose function is to fit closely around the threads of the bolt and thereby to position and secure the locking member or wedge H within the longitudinal groove B. In this position the cap D is held against rotation upon the bolt, and by reason of its polygonal sided body fitting snugly over the nut C said nut is likewise secured. There would be however liability of the cap having lateral movement upon the bolt and consequent disengagement with the nut, to prevent which I have provided the cap with a spring I fastened by any suitable means within said cap at the lower edge of one of the polygonal sides. The spring I, which may be of any kind of resilient metal, extends upwardly and within the cap D to a point just beneath the circumferential flange or collar G, and terminates with its end turned a trifle inwardly to provide a member g for engagement with the threads of the bolt.

In its application my device is fitted as follows: The nut having been screwed to the desired position on the bolt the cap is then placed thereon with the polygonal shaped portion thereof upon the nut; the lug H having, of course, been placed within the groove B of the bolt, and the inwardly turned end g of the spring I having engaged with the threads of the bolt, the nut is now locked against any movement. When the cap is in position its collar G fits closely around the threads of the bolt and thus provides a closed and protected chamber for the threads between the nut and said collar.

For removing the cap it is provided with a perforation J, located adjacent the active end of the thread engaging spring I, through which a tool, or nail, may be inserted to disengage the spring from the threads.

Obviously slight changes may be made and other expedients adopted for carrying into effect my invention without departing from the principles of the same; and as all such variations are clearly within the purview of my invention, I do not limit myself to anything herein shown and described except in so far as I am limited by the prior art to which this invention belongs.

The locking cap, it should be stated, is of greater length than the nut, as indicated in the drawings, and forms a housing for the spring I.

What is claimed as new is,—

1. The combination with a bolt having a longitudinal groove and the nut, of a locking cap of greater length than the nut, said locking cap having one end of reduced diameter to closely embrace the bolt and the other end formed to receive and embrace the nut, said cap inclosing a chamber between the reduced end thereof and the nut, a spring locking member carried by the cap and projecting within said chamber to engage the bolt, substantially as shown and described.

2. The combination with the bolt having a longitudinal groove and the nut, of a locking cap of greater length than the nut, said locking cap having one end of reduced diameter to closely embrace the bolt and the other end formed to receive and embrace the nut, said cap inclosing a chamber between the reduced end thereof and the nut, a spring locking member carried by the cap and projecting within said chamber to engage the bolt, said spring locking member held between the cap and the nut at one end and having its free end projected away from the nut.

3. A nut lock comprising a locking cap having an aperture in one end to closely embrace a to bolt, and having a lug at said apertured end to project toward the axial line of the cap and in a plane with said end, the other end of the cap being open and having angular walls to embrace a nut, said cap having a portion of substantially frusto conical form extending from the apertured end toward the open end and means held within the cap and adapted to engage the bolt to prevent longitudinal movement of the cap in one direction, said cap having an aperture whereby access to said locking means may be obtained, substantially as shown and described.

In testimony whereof I affix my signature, in presence of two witnesses.

JOHN J. LUCKEY.

Witnesses:
 WELLS F. HARVEY,
 H. H. BYRM.